US012707453B2

(12) United States Patent
Zhang et al.

(10) Patent No.: US 12,707,453 B2

(45) Date of Patent: Aug. 11, 2026

(54) METHOD AND APPARATUS FOR UPLINK DATA TRANSMISSION

(71) Applicant: Apogee 5G Global, LLC, Plano, TX (US)

(72) Inventors: Jinfang Zhang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 256 days.

(21) Appl. No.: 18/231,234

(22) Filed: Aug. 7, 2023

(65) Prior Publication Data

US 2024/0089951 A1 Mar. 14, 2024

(30) Foreign Application Priority Data

Sep. 9, 2022 (CN) ......................... 202211103372.8

(51) Int. Cl.
*H04W 72/1263* (2023.01)
*H04W 80/02* (2009.01)

(52) U.S. Cl.
CPC ........ *H04W 72/1263* (2013.01); *H04W 80/02* (2013.01)

(58) Field of Classification Search
CPC ............. H04W 72/1263; H04W 80/02; H04W 72/0446; H04W 76/36; H04W 12/06; H04L 1/0018; H04L 5/0053
See application file for complete search history.

(56) References Cited

FOREIGN PATENT DOCUMENTS

CN 112437442 A * 3/2021 ............ H04W 12/06

OTHER PUBLICATIONS

AT&T, "Waveform Selection mechanisms for DFTsOFDM," 3GPP TSG RAN WG1 #90bis, R1-1718400, Prague, Czech Republic (Aug. 21-25, 2017).
Third Generation Partnership Project, "Technical Specification Group Radio Access Network; NR; Multiplexing and channel coding (Release 17)," 3GPP TS 38.212 V17.2.0 (Jun. 2022).
Third Generation Partnership Project, "Technical Specification Group Radio Access Network; NR; Physical layer procedures for control (Release 17)," 3GPP TS 38.213 V17.2.0 (Jun. 2022).
Third Generation Partnership Project, "Technical Specification Group Radio Access Network; NR; Physical layer procedures for data (Release 17)," 3GPP TS 38.214 V17.2.0 (Jun. 2022).

(Continued)

*Primary Examiner* — Vinncelas Louis
(74) *Attorney, Agent, or Firm* — Volpe Koenig

(57) ABSTRACT

The present application discloses a method and a device for wireless communications. A first node receives a first data unit in a first protocol layer, the first protocol layer being a layer above a physical layer; receives a first signaling, the first signaling indicating an initial transmission; and transmits a first radio signal, the first radio signal carrying a first MAC PDU, the first signaling being used to schedule the first radio signal; herein, a first time length is equal to a time interval length between a reception of the first data unit and a transmission of the first radio signal, and whether the first MAC PDU comprises at least partial bits in the first data unit is related to a relative magnitude of the first time length and a first time threshold. The present application can enhance the system capacity and reduce the UE's power consumption.

20 Claims, 5 Drawing Sheets

(56) References Cited

OTHER PUBLICATIONS

Third Generation Partnership Project, "Technical Specification Group Radio Access Network; NR; Medium Access Control (MAC) protocol specification (Release 17)," 3GPP TS 38.321 V17.1.0 (Jun. 2022).
Third Generation Partnership Project, "Technical Specification Group Radio Access Network; NR; Radio Resource Control (RRC) protocol specification (Release 17)," 3GPP TS 38.331 V17.1.0 (Jun. 2022).
Third Generation Partnership Project, "Technical Specification Group Radio Access Network; NR; NR and NG-RAN Overall Description; Stage 2 (Release 17)," 3GPP TS 38.300 V17.1.0 (Jun. 2022).

* cited by examiner

Case A

Case B

METHOD AND APPARATUS FOR UPLINK DATA TRANSMISSION

CROSS REFERENCE TO RELATED APPLICATIONS

This application claims the priority benefit of Chinese Patent Application No. 202211103372.8, filed on Sep. 9, 2022, the full disclosure of which is incorporated herein by reference.

BACKGROUND

Technical Field

The present application relates to methods and devices in wireless communication systems, and in particular to a method and device supporting delay-sensitive traffics in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 Plenary to standardize the NR. In response to rapidly developing eXtended Reality (XR) and Cloud Gaming (CG) application scenarios and services, the 3GPP started a Study Item (SI) of the "Study on XR Evaluations for NR" in Rel-17. According to the studies, XR and CG are seen as a significant application scenario and service in Rel 18 and releases that follow, where XR and CG collectively refer to all kinds of augmented, virtual or mixed environments, where human-computer communications can be implemented with the help of the handset or wearable terminal User Equipment (UE). Many of the XR and CG use cases are quasi-periodic and have the traffic feature of high data rate and a more stringent packet delay budget (PDB), which collectively pose a series of challenges to NR.

SUMMARY

Inventors find through researches that each Quality of Service (QoS) flow in RAN transmission is characterized by a QoS configuration profile, including a maximum transmission delay of the packet, i.e., a maximum delay from a packet's being received to the packet's being transmitted. Within the maximum delay, the packet is always valid; but once exceeding the maximum delay, the packet will be invalid in upper layers. For delay-sensitive services, when Uplink grant time-domain resources are later than invalidity time of a packet, if the transmission proceeds through a wireless network, not only radio resources will be wasted but the UE's energy consumption will be increased.

To address the above issue, the present application provides a solution, targeting traffics with strict requirements for delay, which discards data packets that fail to meet the delay requests and releases transmission resources to be used for other data transmissions, thus effectively enhances the system capacity and reduces the UE power consumption. What's more, the embodiments in the present application and the characteristics in the embodiments can be arbitrarily combined if there is no conflict. Furthermore, though originally targeted at a Uu air interface, the present application is also applicable to a PC5 air interface. Furthermore, the present application is designed targeting terminal-base station scenario, but can be extended to relay-base station communications, where similar technical effects can be achieved. Additionally, the adoption of a unified solution for various scenarios, including but not limited to V2X and terminal-base station communications, contributes to the reduction of hardcore complexity and costs. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:

receiving a first data unit in a first protocol layer, the first protocol layer being a layer above a physical layer;

receiving a first signaling, the first signaling indicating an initial transmission; and transmitting a first radio signal, the first radio signal carrying a first MAC PDU, the first signaling scheduling the first radio signal;

herein, a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

In one embodiment, the present application is applicable to delay-sensitive traffics.

In one embodiment, the present application is applicable to XR traffics.

In one embodiment, the present application is applicable to the transmitting side.

In one embodiment, a problem to be solved in the present application includes: determining how to process user data according to the residing time in the protocol layer.

In one embodiment, the above method can effectively enhance the system's capacity and reduce the UE's power consumption.

According to one aspect of the present application, comprising:

when the first time length is smaller than the first time threshold, the first MAC PDU comprises the at least partial bits in the first data unit; when the first time length is larger than the first time threshold, the first MAC PDU does not comprise the at least partial bits in the first data unit.

In one embodiment, when the first time length is equal to the first time threshold, the first Medium Access Control (MAC) Protocol Data Unit (PDU) comprises the first data unit.

In one embodiment, when the first time length is equal to the first time threshold, the first MAC PDU does not comprise the first data unit.

In one embodiment, the above method can effectively improve the radio resource utilization ratio.

According to one aspect of the present application, comprising:

transmitting a first indication to the first protocol layer, the first indication indicating time-domain resources occupied by the first radio signal;

herein, the first indication is used to determine the first time length.

In one embodiment, the existing standard does not support making a judgment about whether a packet expires according to a transmission time indicated by a physical layer and performing packet loss on expired packet; the innovation is reflected by determining whether a packet is expired according to a transmission time indicated by the physical layer in any layer above the physical layer and performing packet loss of expired packet, which can enhance the system capacity.

According to one aspect of the present application, comprising:

discarding the first data unit in the first protocol layer when the first time length is larger than the first time threshold.

In one embodiment, the above method can reduce the power consumption of the first node.

In one embodiment, the above method can streamline the processing of the first node.

According to one aspect of the present application, comprising:

when the at least partial bits in the first data unit have been multiplexed in the first MAC PDU, reassembling the first MAC PDU in the first protocol layer;

herein, the first protocol layer is a MAC sublayer; the first time length is larger than the first time threshold.

In one embodiment, the above method can increase the success rate of transmission of useful data.

According to one aspect of the present application, comprising:

when the first signaling schedules a second radio signal, time-domain resources occupied by the first radio signal are no later than time-domain resources occupied by the second radio signal.

In one embodiment, the above method can avoid unnecessary packet loss.

In one embodiment, the above method can enhance the transmission performance.

According to one aspect of the present application, comprising:

receiving a second signaling, the second signaling indicating a second time threshold;

herein, the second time threshold indicates a longest residing time of a first PDCP SDU in a PDCP sublayer, the first PDCP SDU being used to generate the first data unit; the second time threshold and a protocol processing time are used to determine the first time threshold, where the first protocol layer is an RLC sublayer or a MAC sublayer.

In one embodiment, the above method is applicable to the determination of remaining PDB in a Radio Link Control (RLC) sublayer and/or a MAC sublayer.

The present application provides a method in a second node for wireless communications, comprising:

transmitting a first signaling, the first signaling indicating an initial transmission; and receiving a first radio signal, the first radio signal carrying a first MAC PDU, the first signaling scheduling the first radio signal; herein, a first data unit is received in a first protocol layer, the first protocol layer being a layer above a physical layer; a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

According to one aspect of the present application, comprising:

when the first time length is smaller than the first time threshold, the first MAC PDU comprises the at least partial bits in the first data unit; when the first time length is larger than the first time threshold, the first MAC PDU does not comprise the at least partial bits in the first data unit.

According to one aspect of the present application, comprising:

a first indication being transmitted to the first protocol layer, the first indication indicating time-domain resources occupied by the first radio signal;

herein, the first indication is used to determine the first time length.

According to one aspect of the present application, comprising:

the first data unit being discarded in the first protocol layer when the first time length is larger than the first time threshold.

According to one aspect of the present application, comprising:

when the at least partial bits in the first data unit have been multiplexed in the first MAC PDU, the first MAC PDU is reassembled in the first protocol layer;

herein, the first protocol layer is a MAC sublayer; the first time length is larger than the first time threshold.

According to one aspect of the present application, comprising:

when the first signaling schedules a second radio signal, time-domain resources occupied by the first radio signal are no later than time-domain resources occupied by the second radio signal.

According to one aspect of the present application, comprising:

transmitting a second signaling, the second signaling indicating a second time threshold;

herein, the second time threshold indicates a longest residing time of a first PDCP SDU in a PDCP sublayer, the first PDCP SDU being used to generate the first data unit; the second time threshold and a protocol processing time are used to determine the first time threshold, where the first protocol layer is an RLC sublayer or a MAC sublayer.

The present application provides a first node for wireless communications, comprising:

a first receiver, receiving a first data unit in a first protocol layer, the first protocol layer being a layer above a physical layer;

the first receiver, receiving a first signaling, the first signaling indicating an initial transmission; and a first transmitter, transmitting a first radio signal, the first radio signal carrying a first MAC PDU, the first signaling scheduling the first radio signal;

herein, a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

The present application provides a second node for wireless communications, comprising:

a second transmitter, transmitting a first signaling, the first signaling indicating an initial transmission; and a second receiver, receiving a first radio signal, the first radio signal carrying a first MAC PDU, the first signaling scheduling the first radio signal;

herein, a first data unit is received in a first protocol layer, the first protocol layer being a layer above a physical layer; a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
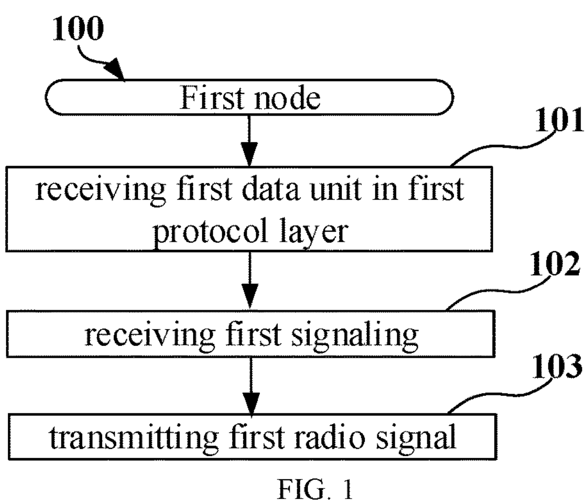
FIG. 1 illustrates a flowchart of transmission of a first node according to one embodiment of the present application.

Embodiment 1 illustrates a flowchart of transmission of a first node according to one embodiment of the present application, as shown in FIG. 1.

In Embodiment 1, a first node 100 receives a first data unit in a first protocol layer in step 101; and receives a first signaling in step 102; and transmits a first radio signal in step 103; herein, the first protocol layer is a layer above a physical layer; the first signaling indicates an initial transmission; the first radio signal carries a first MAC PDU, the first signaling scheduling the first radio signal; a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

In one embodiment, a first data unit is received in a first protocol layer.

In one embodiment, the first data unit is received from an upper layer of the first protocol layer.

In one embodiment, the upper layer is an application layer.

In one embodiment, the upper layer is an Internet Protocol (IP) layer.

In one embodiment, the first protocol layer is a layer above a physical layer.

In one embodiment, the first protocol layer is a MAC sublayer.

In one embodiment, the first protocol layer comprises a MAC entity.

In one embodiment, the first protocol layer is an RLC sublayer.

In one embodiment, the first protocol layer comprises an Acknowledged Mode (AM) RLC entity.

In one subembodiment, the AM RLC entity consists of a transmitting side and a receiving side.

In one embodiment, the first protocol layer comprises an Unacknowledged Mode (UM) RLC entity.

In one subembodiment, the UM RLC entity is a transmitting entity.

In one embodiment, the first protocol layer is a Packet Data Convergence Protocol (PDCP).

In one embodiment, the first protocol layer comprises a PDCP entity.

In one embodiment, the first data unit belongs to a non-signaling radio bearer.

In one embodiment, the non-signaling radio bearer is a radio bearer other than a Signaling Radio Bearer (SRB).

In one embodiment, the non-signaling radio bearer is a Data Radio Bearer (DRB).

In one embodiment, the non-signaling radio bearer is an MBS radio bearer (MRB).

In one embodiment, the first data unit comprises user data.

In one embodiment, the first data unit is a Service Data Unit (SDU).

In one embodiment, when the first protocol layer is a PDCP sublayer, the first data unit is a PDCP SDU.

In one subembodiment, the first data unit is received from an SDAP sublayer.

In one embodiment, when the first protocol layer is an RLC sublayer, the first data unit is an RLC SDU.

In one subembodiment, the first data unit is received from a PDCP sublayer.

In one embodiment, when the first protocol layer is a MAC sublayer, the first data unit is a MAC SDU.

In one subembodiment, the first data unit is received from an RLC sublayer.

In one embodiment, a data unit comprises at least 1 bit.

In one embodiment, a data unit comprises at least 1 byte.

In one embodiment, a first signaling is received in a physical layer.

In one embodiment, the first signaling is a physical layer signaling.

In one embodiment, a first signaling is received from an air interface.

In one embodiment, the air interface is a Uu air interface.

In one embodiment, the air interface is a PC5 air interface.

In one embodiment, the first signaling is transmitted internally within the first node.

In one embodiment, the first signaling is conveyed from an upper layer of the first node to a physical layer of the first node.

In one embodiment, the first signaling is pre-configured.

In one embodiment, the first signaling is configured.

In one embodiment, the first signaling is configured and activated.

In one embodiment, the first signaling is a dynamic scheduling signaling.

In one embodiment, the first signaling is a Physical Downlink Control CHannel (PDCCH).

In one embodiment, the first signaling is a piece of Downlink Control Information (DCI).

In one embodiment, the first signaling indicates a UL grant of configured UL grant type 1.

In one embodiment, the first signaling indicates a UL grant of configured UL grant type 2.

In one embodiment, the first signaling indicates an SL grant of SL configured grant type 1.

In one embodiment, the first signaling indicates a SL grant of SL configured grant type 2.

In one embodiment, the first signaling is for a serving cell of the first node and is addressed to a Cell-Radio Network Temporary Identifier (C-RNTI), or a temporary C-RNTI of a MAC entity to which the serving cell belongs.

In one embodiment, the first signaling is for a serving cell of the first node and is addressed to a Configured Scheduling (CS)-RNTI of a MAC entity to which the serving cell belongs.

In one embodiment, the first signaling is for a serving cell of the first node and is addressed to a Sidelink (SL)-RNTI, or a SL-CS-RNTI of a MAC entity to which the serving cell belongs.

In one embodiment, the first signaling is a Random Access Response (RAR).

In one embodiment, the first signaling is used for scheduling a first radio signal.

In one embodiment, the first signaling comprises scheduling information of the first radio signal.

In one embodiment, the first signaling comprises at least one of time-frequency information or Hybrid Automatic Repeat Request (HARQ) information or Modulation and Coding Scheme (MCS) information of the first radio signal.

In one embodiment, the first radio signal is a Physical Uplink Shared Channel (PUSCH).

In one subembodiment, the first signaling indicates a UL grant.

In one embodiment, the first radio signal comprises a Physical Sidelink Shared Channel (PSSCH).

In one subembodiment, the first signaling indicates a SL grant.

In one embodiment, the first signaling indicates an initial transmission.

In one embodiment, the initial transmission includes: a new transmission.

In one embodiment, the initial transmission includes: a first transmission of a MAC PDU.

In one embodiment, the initial transmission does not include a retransmission.

In one embodiment, the first signaling indicating an initial transmission comprises that: a value of a New Data Indication (NDI) field comprised by the first signaling is toggled; herein, a Cyclic Redundancy Check (CRC) of the first signaling is scrambled by a C-RNTI, or by a SL-RNTI.

In one subembodiment, the first signaling is a dynamic scheduling signaling.

In one embodiment, the phrase that a value of an NDI field comprised by the first signaling is toggled comprises that: the value of the NDI field comprised by the first signaling is different from a value of an NDI field comprised by a most recent signaling before the first signaling that indicates a same HARQ process.

In one embodiment, the first signaling indicating an initial transmission comprises that: the value of the NDI field comprised by the first signaling is 0; a value of a HARQ process number comprised by the first signaling is all-0; a value of a Redundancy Version (RV) comprised by the first signaling is all-0; herein, CRC of the first signaling is scrambled by a CS-RNTI.

In one subembodiment, the first signaling is used for activating a configured UL grant type 2 scheduling.

In one subembodiment, the first node is provided with a UL grant type 2 PUSCH configuration.

In one embodiment, the first signaling indicating an initial transmission comprises that: the value of the NDI field comprised by the first signaling is 0; a value of a HARQ process number comprised by the first signaling is a configuration index of an activated UL grant Type 2 PUSCH; a value of a Redundancy Version (RV) comprised by the first signaling is all-0; herein, CRC of the first signaling is scrambled by a CS-RNTI.

In one subembodiment, the first signaling is used for activating a configured UL grant type 2 scheduling.

In one subembodiment, the first node is provided with multiple UL grant type 2 PUSCH configurations.

In one embodiment, the first signaling indicating an initial transmission comprises that: the value of the NDI field comprised by the first signaling is 0; a value of a HARQ process number comprised by the first signaling is all-0; herein, CRC of the first signaling is scrambled by a SL-CS-RNTI.

In one subembodiment, the first signaling is used for activating a SL configured grant type 2 scheduling.

In one subembodiment, the first node is provided with a SL configured grant type 2 configuration.

In one embodiment, the first radio signal is transmitted by the air interface.

In one embodiment, the first radio signal is transmitted via an Uplink (UL).

In one embodiment, the first radio signal is transmitted via a Sidelink (SL).

In one embodiment, the first radio signal carries a first MAC PDU.

In one embodiment, the first MAC PDU comprises at least one byte.

In one embodiment, all or part of bits in the first MAC PDU are used for generating the first radio signal.

In one embodiment, all or part of bits in the first MAC PDU are used together with a reference signal for generating the first radio signal.

In one embodiment, the first radio signal is obtained by all or part of bits in the first MAC PDU sequentially through CRC Calculation, Channel Coding, Rate matching, Scrambling, and Modulation, Layer Mapping, Antenna Port Mapping, Mapping to Virtual Resource Blocks, and Mapping from Virtual to Physical Resource Blocks, OFDM Baseband Signal Generation and Modulation and Up conversion.

In one embodiment, the first radio signal is obtained by all or part of bits in the first MAC PDU sequentially through CRC Calculation, Channel Coding, Rate matching, Scrambling, and Modulation, Mapping to Physical Resources, OFDM Baseband Signal Generation and Modulation and Up conversion.

In one embodiment, a first time length is equal to a time interval length between a reception of the first data unit and a transmission of the first radio signal.

In one embodiment, the sentence that the first time length is equal to a time interval length between a reception of the first data unit and a transmission of the first radio signal comprises that: a first time length is equal to a time interval length between a time of receiving the first data unit and a start time of the first radio signal.

In one embodiment, the sentence that the first time length is equal to a time interval length between a reception of the first data unit and a transmission of the first radio signal comprises that: a first time length is equal to a time interval length between a time of receiving the first data unit and an end time of the first radio signal.

In one embodiment, the sentence that the first time length is equal to a time interval length between a reception of the first data unit and a transmission of the first radio signal comprises that: a first time length is equal to a time interval length between a time of receiving the first data unit and a start time of time-domain resources occupied by the first radio signal.

In one embodiment, a start time of time-domain resources occupied by the first radio signal includes: a start time of a slot in which time-domain resources occupied by the first radio signal are comprised.

In one embodiment, a start time of time-domain resources occupied by the first radio signal includes: a start time of a subframe in which time-domain resources occupied by the first radio signal are comprised.

In one embodiment, a start time of time-domain resources occupied by the first radio signal includes: a start time of the first symbol occupied by the first radio signal.

In one embodiment, a start time of time-domain resources occupied by the first radio signal includes: a start time of the first slot occupied by the first radio signal.

In one embodiment, the sentence that the first time length is equal to a time interval length between a reception of the first data unit and a transmission of the first radio signal comprises that: a first time length is equal to a time interval length between a time of receiving the first data unit and an end time of time-domain resources occupied by the first radio signal.

In one embodiment, an end time of time-domain resources occupied by the first radio signal includes: an end time of a slot in which time-domain resources occupied by the first radio signal are comprised.

In one embodiment, an end time of time-domain resources occupied by the first radio signal includes: an end time of a subframe in which time-domain resources occupied by the first radio signal are comprised.

In one embodiment, an end time of time-domain resources occupied by the first radio signal includes: the end of the last symbol occupied by the first radio signal.

In one embodiment, an end time of time-domain resources occupied by the first radio signal includes: the end of the last slot occupied by the first radio signal.

In one embodiment, a time of receiving the first data unit is a time at which the first data unit is received in the first protocol layer.

In one embodiment, the first time length comprises Q1 time units; where Q1 is a positive number.

In one embodiment, the time unit is a slot.

In one embodiment, the time unit is a symbol.

In one embodiment, the time unit is millisecond (ms).

In one embodiment, whether the first MAC PDU comprises at least partial bits in the first data unit is related to a relative magnitude of the first time length and the first time threshold.

In one embodiment, the first transmitter determines whether the first MAC PDU comprises at least partial bits in the first data unit according to the relative magnitude of the first time length and the first time threshold.

In one embodiment, the first time threshold indicates a longest time interval from the first data unit being received in the first protocol layer to the first data unit being transmitted.

In one embodiment, that the first time threshold indicates a longest time interval from the first data unit being received in the first protocol layer to the first data unit being transmitted comprises: the first time threshold indicates a longest time interval length in time from the first data unit being received in the first protocol layer to a radio signal carrying the first data unit being transmitted.

In one embodiment, the first time threshold indicates a packet delay budget (PDB) of the first data unit.

In one embodiment, the first time threshold indicates a remaining PDB of the first data unit.

In one embodiment, the first time threshold comprises Q2 said time units; where Q2 is a positive number.

Embodiment 2

Figure 2:
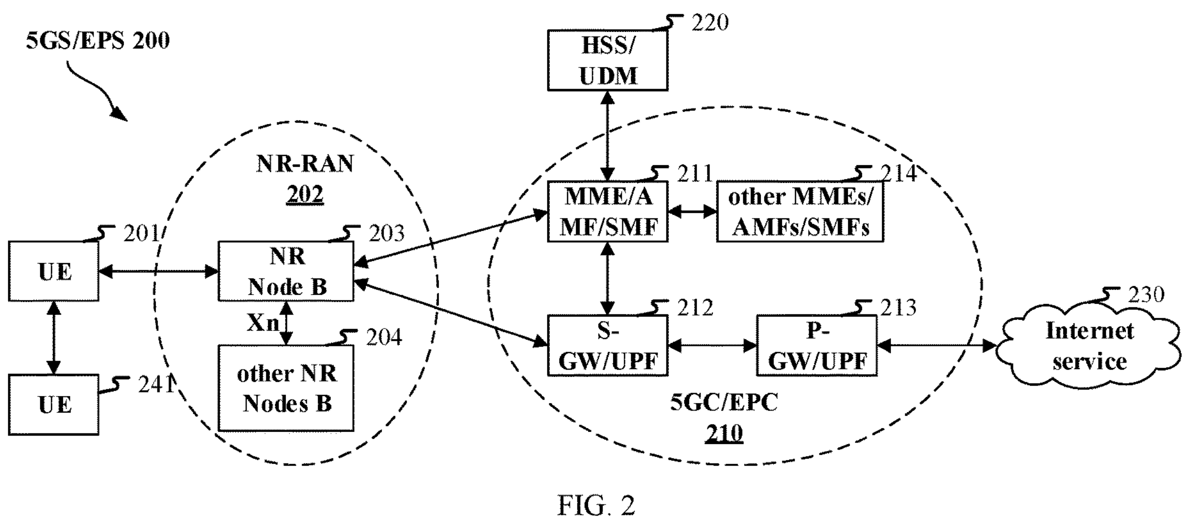
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 illustrates a network architecture 200 of NR 5G, Long-Term Evolution (LTE), and Long-Term Evolution Advanced (LTE-A) systems. The NR 5G or LTE, or LTE-A network architecture 200 may be called a 5G System/Evolved Packet System (5GS/EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server/Unified Data Management (HSS/UDM) 220 and an Internet Service 230. The 5GS/EPS may be interconnected with other access networks. For simple description, the entities/interfaces are not shown. As shown in FIG. 2, the 5GS/EPS provides packet switching services. Those skilled in the art will find it easy to understand that various concepts presented throughout the present application can be extended to networks providing circuit switching services or other cellular networks. The NG-RAN comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The XnAP protocol for the Xn interface is used for transmitting control-plane messages of the wireless network, while the user-plane protocol for the Xn interface is used for transmitting user-plane data. The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, the gNB 203 can be a satellite, an aircraft or a terrestrial base station relayed through the satellite. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted equipment, vehicle-mounted communication units, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services.

In one embodiment, the UE 201 corresponds to a first node in the present application.

In one embodiment, the gNB 203 corresponds to a second node in the present application.

In one embodiment, the UE 201 is a User Equipment (UE).

In one embodiment, the UE 201 is a relay device.

In one embodiment, the UE 201 is a RoadSide Unit (RSU).

In one embodiment, the gNB 203 is a Macro Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station supporting large time-delay difference.

In one embodiment, the gNB 203 is a flight platform.

In one embodiment, the gNB 203 is satellite equipment.

In one embodiment, the gNB 203 is a base station supporting large time-delay difference.

In one embodiment, the gNB 203 is a piece of test equipment (e.g., a transceiving device simulating partial functions of the base station, or a signaling test instrument).

In one embodiment, a radio link from the UE 201 to the gNB 203 is an uplink, the uplink being used for performing uplink transmission.

In one embodiment, a radio link from the gNB 203 to the UE 201 is a downlink, the downlink being used for performing downlink transmission.

In one embodiment, a radio link between the UE 201 and the UE 241 is a sidelink, the sidelink being used for performing sidelink transmission.

In one embodiment, the UE 201 and the gNB 203 are connected by a Uu air interface.

In one embodiment, the UE 201 and the UE 241 are connected by a PC5 air interface.

Embodiment 3

Figure 3:
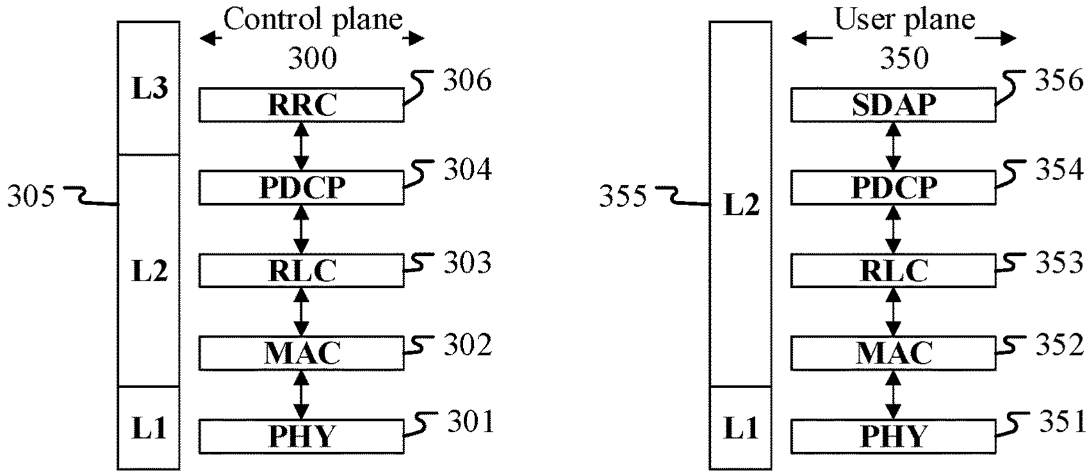
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 of a UE and a gNB is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection, and also support for handover of a UE between gNBs. The RLC sublayer 303 provides segmentation and reassembling of a packet, retransmission of a lost packet through an Automatic Repeat Request (ARQ), and detection of duplicate packets and protocol errors. The MAC sublayer 302 provides mappings between a logical channel and a transport channel as well as multiplexing of logical channels. The MAC sublayer 302 is also responsible for allocating between UEs various radio resources (i.e., resource block) in a cell. The MAC sublayer 302 is also in charge of Hybrid Automatic Repeat Request (HARQ) operation. In the control plane 300, The Radio Resource Control (RRC) sublayer 306 in the L3 layer is responsible for acquiring radio resources (i.e., radio bearer) and configuring the lower layer using an RRC signaling between the gNB and the UE. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between Quality of Service (QoS) streams and a Data Radio Bearer (DRB), so as to support diversified traffics. The radio protocol architecture of UE in the user plane 350 may comprise all or part of protocol sublayers of a SDAP sublayer 356, a PDCP sublayer 354, a RLC sublayer 353 and a MAC sublayer 352 in L2. Although not described in FIG. 3, the UE may comprise several higher layers above the L2 355, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to a first node in the present application.

In one embodiment, the radio protocol architecture in FIG. 3 is applicable to a second node in the present application.

In one embodiment, entities of multiple sublayers of the control plane in FIG. 3 form an SRB vertically.

In one embodiment, entities of multiple sublayers of the user plane in FIG. 3 form a DRB vertically.

In one embodiment, entities of multiple sublayers of the user plane in FIG. 3 form an MRB vertically.

In one embodiment, the first data unit in the present application is generated by the SDAP 356.

In one embodiment, the first data unit in the present application is generated by the PDCP 354.

In one embodiment, the first data unit in the present application is generated by the RLC 353.

In one embodiment, the first signaling in the present application is generated by the PHY 301.

In one embodiment, the first signaling in the present application is generated by the PHY 351.

In one embodiment, the first radio signal in the present application is generated by the PHY 351.

In one embodiment, the first MAC PDU in the present application is generated by the MAC 352.

In one embodiment, the first indication in the present application is generated by the PHY 301.

In one embodiment, the first indication in the present application is generated by the PHY 351.

In one embodiment, the second signaling in the present application is generated by the RRC 306.

In one embodiment, in a protocol layer, a data unit received from upper layers is an SDU, and a data unit being processed by the protocol layer is a PDU, the PDU being conveyed to lower layers.

In one embodiment, in a protocol layer, a data unit received from lower layers is a PDU, and a data unit being processed by the protocol layer is an SDU, the SDU being conveyed to upper layers.

In one embodiment, taking a PDCP sublayer as an example for illustration, at the transmitting side, a PDCP sublayer receives a PDCP SDU from an SDAP sublayer, which is then processed by the PDCP sublayer for generating a PDCP PDU, which is to be conveyed to an RLC sublayer.

In one embodiment, taking the data conveyance on interfaces of a PDCP sublayer and an RLC sublayer as an example for illustration, a PDU generated by PDCP is called a PDCP PDU in a PDCP sublayer, and is called an RLC SDU in an RLC sublayer, namely, the PDCP sublayer conveys a PDCP PDU to the RLC sublayer and the RLC sublayer receives an RLC SDU from the PDCP sublayer.

In one embodiment, an SDAP PDU and a PDCP SDU can be exchanged, and a PDCP PDU and an RLC SDU can be exchanged, and an RLC PDU and a MAC SDU can be exchanged.

In one embodiment, the L2 305 or 355 belongs to higher layers.

In one embodiment, the RRC sublayer 306 in the L3 belongs to a higher layer.

Embodiment 4

Figure 4:
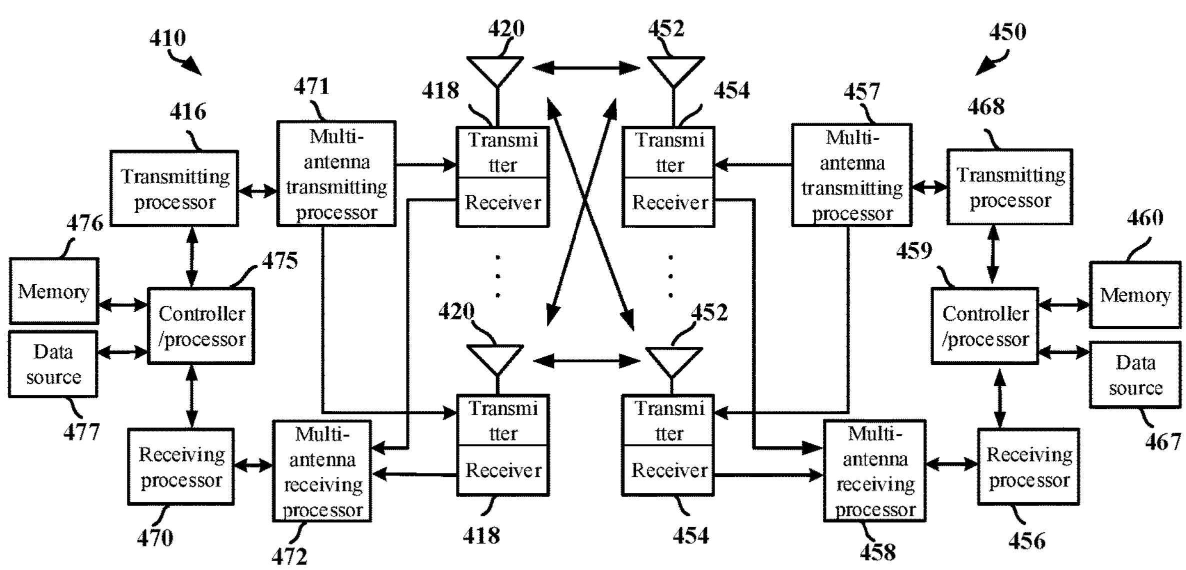
FIG. 4 illustrates a schematic diagram of hardcore modules in a communication device according to one embodiment of the present application.

Embodiment 4 illustrates a schematic diagram of hardcore modules in a communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network or from a data source 477 is provided to the controller/processor 475. The core network and data source 477 represents all protocol layers above the L2 layer. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In a transmission from the second communication device 410 to the first communication device 450, the controller/processor 459 provides multiplexing between a transport channel and a logical channel, packet reassembling, decrypting, header decompression, control signal processing so as to recover a higher-layer packet from the second communication device 410. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device 450. The higher-layer packet coming from the controller/processor 475 may be provided to the core network, or all protocol layers above the L2, or, various control signals can be provided to the core network or L3 for processing.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first data unit in a first protocol layer, the first protocol layer being a layer above a physical layer; receives a first signaling, the first signaling indicating an initial transmission; and transmits a first radio signal, the first radio signal carrying a first MAC PDU, the first signaling scheduling the first radio signal; herein, a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

In one embodiment, the first communication device 450 comprises a memory that stores a computer readable instruction program, the computer readable instruction program generates actions when executed by at least one processor, which include: receiving a first data unit in a first protocol layer, the first protocol layer being a layer above a physical layer; receiving a first signaling, the first signaling indicating an initial transmission; and transmitting a first radio signal, the first radio signal carrying a first MAC PDU, the first signaling scheduling the first radio signal; herein, a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

In one embodiment, the second node 410 comprises at least one processor and at least one memory, the at least one memory comprises computer program codes; the at least one memory and the computer program codes are configured to be used in collaboration with the at least one processor. The second node 410 at least: transmits a first signaling, the first signaling indicating an initial transmission; and receives a first radio signal, the first radio signal carrying a first MAC PDU, the first signaling scheduling the first radio signal; herein, a first data unit is received in a first protocol layer, the first protocol layer being a layer above a physical layer; a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

In one embodiment, the second node 410 comprises a memory that stores a computer readable instruction program, the computer readable instruction program generates actions when executed by at least one processor, which include: transmitting a first signaling, the first signaling indicating an initial transmission; and receiving a first radio signal, the first radio signal carrying a first MAC PDU, the first signaling scheduling the first radio signal; herein, a first data unit is received in a first protocol layer, the first protocol layer being a layer above a physical layer; a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a relay node.

In one embodiment, the first communication device 450 is a UE supporting V2X.

In one embodiment, the first communication device 450 is vehicle-mounted equipment.

In one embodiment, the first communication device 450 is an RSU.

In one embodiment, the second communication device 410 is a base station (gNB/eNB).

In one embodiment, the second communication device 410 is a base station supporting V2X.

In one embodiment, the second communication device 410 is vehicle-mounted equipment.

In one embodiment, the second communication device 410 is an RSU.

In one embodiment, at least one of the antenna 452, the receiver 454, the multi-antenna receiving processor 458, the receiving processor 456 or the controller/processor 459 is used for receiving a first data unit in the present application.

In one embodiment, at least one of the antenna 420, the transmitter 418, the multi-antenna transmitting processor 471, the transmitting processor 416 or the controller/processor 475 is used for transmitting a first signaling in the present application.

In one embodiment, at least one of the antenna 452, the receiver 454, the multi-antenna receiving processor 458, the receiving processor 456 or the controller/processor 459 is used for receiving a first signaling in the present application.

In one embodiment, at least one of the antenna 452, the transmitter 454, the multi-antenna transmitting processor 457, the transmitting processor 468 or the controller/processor 459 is used for transmitting a first radio signal in the present application.

In one embodiment, at least one of the antenna 420, the receiver 418, the multi-antenna receiving processor 472, the receiving processor 470 or the controller/processor 475 is used for receiving a first radio signal in the present application.

In one embodiment, at least one of the antenna 452, the transmitter 454, the multi-antenna transmitting processor 457, the transmitting processor 468 or the controller/processor 459 is used for transmitting a first indication in the present application.

In one embodiment, at least one of the antenna 420, the transmitter 418, the multi-antenna transmitting processor 471, the transmitting processor 416 or the controller/processor 475 is used for transmitting a second signaling in the present application.

In one embodiment, at least one of the antenna 452, the receiver 454, the multi-antenna receiving processor 458, the receiving processor 456 or the controller/processor 459 is used for receiving a second signaling in the present application.

Embodiment 5

Figure 5:
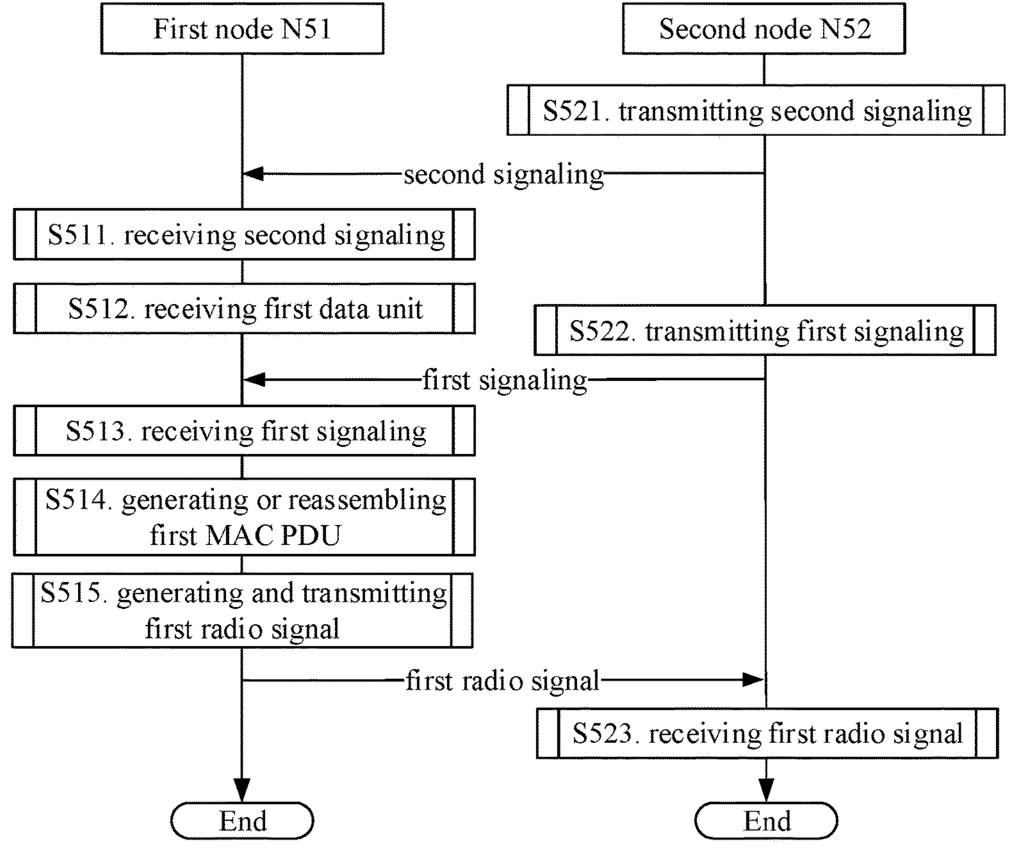
FIG. 5 illustrates a flowchart of a radio signal transmission according to one embodiment of the present application.

Embodiment 5 illustrates a flowchart of a radio signal transmission according to one embodiment of the present application, as shown in FIG. 5. In FIG. 5, a first node N51 and a second node N52 are in communication via a Uu air interface. It should be particularly noted that the sequence illustrated herein does not set any limit to the signal transmission order or implementation order in the present application.

The first node N51 receives a second signaling in step S511; and receives a first data unit in step S512; and receives a first signaling in step S513; generates or reassembles a first MAC PDU in step S514; generates and transmits a first radio signal in step S515.

The second node N52 transmits a second signaling in step S521; and transmits a first signaling in step S522; and receives a first radio signal in step S523.

In Embodiment 5, receiving a first data unit in a first protocol layer, the first protocol layer being a layer above a physical layer; receiving a first signaling, the first signaling indicating an initial transmission; and transmitting a first radio signal, the first radio signal carrying a first MAC PDU, the first signaling scheduling the first radio signal; herein, a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted; when the first signaling schedules a second radio signal, time-domain resources occupied by the first radio signal are no later than time-domain resources occupied by the second radio signal; receiving a second signaling, the second signaling indicating a second time threshold; herein, the second time threshold indicates a longest residing time of a first PDCP SDU in a PDCP sublayer, the first PDCP SDU being used to generate the first data unit; the second time threshold and a protocol processing time are used to determine the first time threshold, where the first protocol layer is an RLC sublayer or a MAC sublayer.

Embodiment 5 is applicable to scenarios in which the first radio signal is a PUSCH.

In one embodiment, the second node N52 is a maintenance base station for a serving cell of the first node N51.

In one embodiment, the second node N52 is a Transmit/Receive Point (TRP) of the first node N51.

In one embodiment, the second node N52 is a base station for a primary cell (PCell) of the first node N51.

In one embodiment, the second node N52 is a base station for a secondary cell (SCell) of the first node N51.

In one embodiment, receiving a second signaling, the second signaling indicating a second time threshold.

In one embodiment, the second signaling is received in an RRC layer.

In one embodiment, the second signaling is transmitted via an air interface.

In one embodiment, the second signaling is configured.

In one embodiment, the second signaling is a higher-layer signaling.

In one embodiment, the second signaling is an RRC signaling.

In one embodiment, the second signaling comprises all or partial Information Elements (IEs) in a Radio Resource Control (RRC) signaling.

In one embodiment, the second signaling comprises all or part of fields of an IE in an RRC signaling.

In one embodiment, the second signaling is an RRCReconfiguration message.

In one embodiment, the second time threshold comprises Q3 said time units; where Q3 is a positive number.

In one embodiment, the value of Q3 is no less than the value of Q2.

In one embodiment, the first receiver receives a second signaling, the second signaling indicating a second time threshold; herein, the second time threshold indicates a longest residing time of a first PDCP SDU in a PDCP sublayer, the first PDCP SDU being used to generate the first data unit; the second time threshold and a protocol processing time are used to determine the first time threshold, where the first protocol layer is an RLC sublayer or a MAC sublayer.

In one embodiment, the second time threshold indicates a longest residing time of a first PDCP SDU in a PDCP sublayer.

In one embodiment, the sentence that the second time threshold indicates a longest residing time of a first PDCP SDU in a PDCP sublayer comprises: the second time threshold indicating a PDB of the first PDCP SDU.

In one embodiment, the sentence that the second time threshold indicates a longest residing time of a first PDCP SDU in a PDCP sublayer comprises: starting a first timer when receiving the first PDCP SDU, and discarding the first PDCP SDU when the first timer expires; herein, the second time threshold is an expiration value of the first timer.

In one embodiment, the sentence that the second time threshold indicates a longest residing time of a first PDCP SDU in a PDCP sublayer comprises: starting a first timer when receiving the first PDCP SDU, and discarding the first PDCP SDU when the first timer expires; if a corresponding PDCP data PDU has been delivered to a lower layer, indicating to the lower layer the discarding; herein, the second time threshold is an expiration value of the first timer.

In one subembodiment, the lower layer is an RLC sublayer.

In one subembodiment, the lower layer is a MAC sublayer.

In one embodiment, the first timer is maintained in a PDCP sublayer.

In one embodiment, the first timer is a discardTimer, where the second time threshold is configured by the network.

In one embodiment, the first timer has been running since it started.

In one embodiment, while the first timer is in a running state, update the first timer in a next time interval, and determine whether the first timer is expired.

In one embodiment, the time interval comprises 1 millisecond (ms).

In one embodiment, the time interval comprises a time length of 1 slot.

In one embodiment, the time interval comprises a time length of 1 subframe.

In one embodiment, a value of the first timer is set to 0 when starting the first timer, the phrase of updating the first timer comprising: incrementing the value of the first timer by 1; when the value of the first timer is the second time threshold, it is determined that the first timer is expired.

In one embodiment, a value of the first timer is set to the second time threshold when starting the first timer, the phrase of updating the first timer comprising: decrementing the value of the first timer by 1; when the value of the first timer is 0, it is determined that the first timer is expired.

In one embodiment, the first PDCP SDU is used for generating the first data unit.

In one embodiment, the sentence that the first PDCP SDU is used for generating the first data unit comprises that: the first data unit is generated by the first PDCP SDU through a PDCP protocol processing, where the first data unit is an RLC SDU.

In one embodiment, the PDCP protocol processing includes Integrity protection and verification.

In one embodiment, the PDCP protocol processing includes ciphering.

In one embodiment, the PDCP protocol processing includes RObust Header Compression (ROHC).

In one embodiment, the PDCP protocol processing includes adding a PDCP Protocol Head.

In one embodiment, the sentence that the first PDCP SDU is used for generating the first data unit comprises that: the first data unit is generated by the first PDCP SDU respectively through a PDCP protocol processing and an RLC protocol processing, where the first data unit is a MAC SDU.

In one embodiment, the RLC protocol processing includes adding an RLC Protocol Head.

In one embodiment, the second time threshold and a protocol processing time are used to determine the first time threshold.

In one embodiment, the first receiver determines the first time threshold according to the second time threshold and a protocol processing time.

In one embodiment, the sentence that the second time threshold and a protocol processing time are used to determine the first time threshold comprises that: the second time threshold being subtracted by a protocol processing time in a PDCP sublayer is the first time threshold; herein, the first protocol layer is an RLC sublayer.

In one embodiment, the sentence that the second time threshold and a protocol processing time are used to determine the first time threshold comprises that: the second time threshold being subtracted by a protocol processing time in a PDCP sublayer and then by a protocol processing time in an RLC sublayer is the first time threshold; herein, the first protocol layer is a MAC sublayer.

In one embodiment, the first time threshold is a remaining PDB.

In one embodiment, the sentence that the second time threshold and a protocol processing time are used to determine the first time threshold comprises that: the second time threshold is equal to the first time threshold; herein, the first protocol layer is a PDCP sublayer, the protocol processing time being 0; a PDCP entity comprising the first data unit is only associated with one RLC entity.

In one embodiment, the first receiver determines that the first time threshold is the second time threshold; herein, the first protocol layer is a PDCP sublayer.

In one embodiment, when the first signaling schedules a second radio signal, the first radio signal is no later than the second radio signal.

In one embodiment, when the first signaling schedules a second radio signal, time-domain resources occupied by the first radio signal are no later than time-domain resources occupied by the second radio signal.

In one embodiment, when the first signaling schedules a second radio signal, time-domain resources occupied by the first radio signal are earlier than time-domain resources occupied by the second radio signal.

In one embodiment, the phrase that when the first signaling schedules a second radio signal, time-domain resources occupied by the first radio signal are no later than time-domain resources occupied by the second radio signal comprises that: when the first signaling schedules multiple radio signals, time-domain resources occupied by the first radio signal are no later than time-domain resources occupied by any other radio signal among the multiple radio signals; herein, the multiple radio signals include the first radio signal and the second radio signal.

In one embodiment, the phrase that when the first signaling schedules a second radio signal, time-domain resources occupied by the first radio signal are earlier than time-domain resources occupied by the second radio signal comprises that: when the first signaling schedules multiple radio signals, time-domain resources occupied by the first radio signal are earlier than time-domain resources occupied by any other radio signal among the multiple radio signals; herein, the multiple radio signals include the first radio signal and the second radio signal.

In one embodiment, the phrase that time-domain resources occupied by the first radio signal are no later than time-domain resources occupied by the second radio signal comprises that: a start time of the time-domain resources occupied by the first radio signal are no later than a start time of the time-domain resources occupied by the second radio signal.

In one embodiment, the phrase that time-domain resources occupied by the first radio signal are no later than time-domain resources occupied by the second radio signal comprises that: an end time of the time-domain resources occupied by the first radio signal are no later than an end time of the time-domain resources occupied by the second radio signal.

In one embodiment, time-frequency resources occupied by the first radio signal belong to an Uplink BandWidth Part (UL BWP).

Embodiment 6

Figure 6:
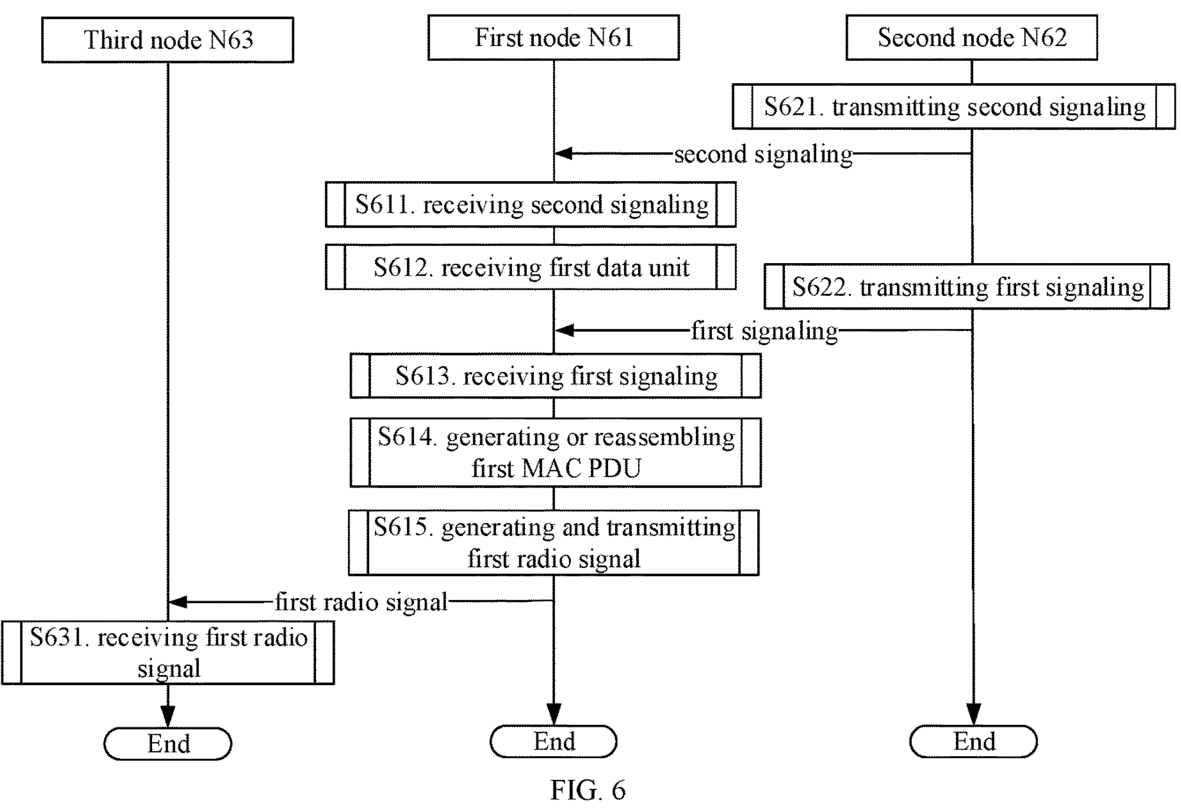
FIG. 6 illustrates another flowchart of a radio signal transmission according to one embodiment of the present application.

Embodiment 6 illustrates another flowchart of a radio signal transmission according to one embodiment of the present application, as shown in FIG. 6. In FIG. 6, a first node N61 and a second node N62 are in communication via a Uu air interface, while the first node N61 and a third node N63 are in communication via a PC5 air interface. It should be particularly noted that the sequence illustrated herein does not set any limit to the signal transmission order or implementation order in the present application.

The first node N61 receives a second signaling in step S611; and receives a first data unit in step S612; and receives a first signaling in step S613; generates or reassembles a first MAC PDU in step S614; generates and transmits a first radio signal in step S615.

The second node N62 transmits a second signaling in step S621; and transmits a first signaling in step S622.

The third node N63 receives a first radio signal in step S631.

Embodiment 6 is applicable to scenarios in which the first radio signal comprises a PSSCH.

Embodiment 6 is different from Embodiment 5 in the step that a receiver of the first radio signal is the third node.

in one embodiment, the second node N62 and the third node N63 are non-QCL.

In one embodiment, the third node N63 is another UE.

In one embodiment, the third node N63 is an RSU.

In one embodiment, the first node N61 is a relay node.

In one embodiment, the first node N61 corresponds to the UE 241 in FIG. 2 of the present application.

In one embodiment, the first node N61 and the third node N63 are in communication via sidelink.

In one embodiment, time-frequency resources occupied by the first radio signal belong to a sidelink communication resource pool.

In one embodiment, time-frequency resources occupied by the first radio signal belong to an SL BWP.

In one embodiment, the first radio signal comprises a Physical Sidelink Control CHannel (PSCCH).

Embodiment 7

Figure 7:
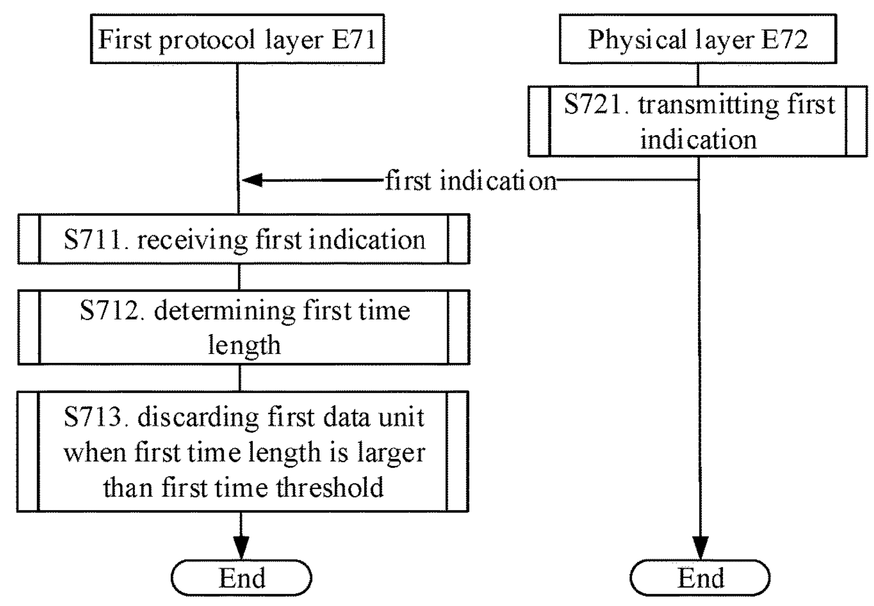
FIG. 7 illustrates a flowchart of a signal transmission according to one embodiment of the present application.

Embodiment 7 illustrates a flowchart of a signal transmission according to one embodiment of the present application, as shown in FIG. 7. In FIG. 7, both a first protocol layer E71 and a physical layer E72 are in a first node, where the first protocol layer E71 and the physical layer E72 are in communication via an inter-layer interface. It should be particularly noted that the sequence illustrated herein does not set any limit to the signal transmission order or implementation order in the present application.

The first protocol layer E71 receives a first indication in step S711; and determines a first time length in step S712; and in step S713, when the first time length is larger than a first time threshold, discards a first data unit.

The physical layer E72 transmits a first indication in step S721.

In one embodiment, a physical layer of the first node transmits a first indication to the first protocol layer, the first indication indicating time-domain resources occupied by the first radio signal.

In one embodiment, the first indication is used to determine the first time length.

In one embodiment, the first transmitter determines the first time length according to the first indication.

In one embodiment, the first transmitter determines the first time length according to the first indication and a time of receiving the first data unit.

In one embodiment, the first indication is an inter-layer indication between protocol layers.

In one embodiment, the first transmitter determines the first time length in the first protocol layer according to the first indication.

In one embodiment, the phrase that the first indication indicating time-domain resources occupied by the first radio signal comprises that: the first indication comprises a time interval between a start time of time-domain resources occupied by the first radio signal and a time of transmitting the first indication.

In one embodiment, the phrase that the first indication indicating time-domain resources occupied by the first radio signal comprises that: the first indication comprises a time interval between an end time of time-domain resources occupied by the first radio signal and a time of transmitting the first indication.

In one subembodiment of the above two embodiments, the first time length is a sum of a time interval between receiving the first data unit in the first protocol layer and receiving the first indication plus the time interval indicated by the first indication.

In one embodiment, the phrase that the first indication indicating time-domain resources occupied by the first radio signal comprises that: the first indication comprises a time interval between a start time of time-domain resources occupied by the first radio signal and an end time of receiving the first indication.

In one embodiment, the phrase that the first indication indicating time-domain resources occupied by the first radio signal comprises that: the first indication comprises a time interval between an end time of time-domain resources occupied by the first radio signal and an end time of receiving the first indication.

In one subembodiment of the above two embodiments, the first time length is a sum of a time interval between receiving the first data unit in the first protocol layer and receiving the first signaling plus the time interval indicated by the first indication.

In one embodiment, the phrase that the first indication indicating time-domain resources occupied by the first radio signal comprises that: the first indication comprises a start time of time-domain resources occupied by the first radio signal.

In one embodiment, the phrase that the first indication indicating time-domain resources occupied by the first radio signal comprises that: the first indication comprises an end time of time-domain resources occupied by the first radio signal.

In one subembodiment of the above two embodiments, the first time length is a time length from a time of receiving the first data unit in the first protocol layer to a time indicated by the first indication.

In one embodiment, the first indication comprises a slot number.

In one embodiment, the first indication comprises a slot number and a symbol offset.

In one embodiment, when the first time length is larger than the first time threshold, the first data unit is discarded in the first protocol layer.

In one embodiment, when the first time length is equal to the first time threshold, the first data unit is discarded in the first protocol layer.

In one subembodiment of the above two embodiments, the first protocol layer delivers at least partial bits in a second data unit to a MAC sublayer for generating the first MAC PDU; herein, the first protocol layer is an RLC sublayer.

In one subembodiment of the above two embodiments, at least partial bits in a second data unit are multiplexed for generating the first MAC PDU; herein, the first protocol layer is a MAC sublayer.

In one embodiment, the second data unit and the first data unit belong to a same logical channel.

In one embodiment, the second data unit and the first data unit belong to different logical channels.

In one embodiment, when the first time length is smaller than the first time threshold, discarding the first data unit in the first protocol layer is canceled.

In one embodiment, when the first time length is equal to the first time threshold, discarding the first data unit in the first protocol layer is canceled.

Embodiment 8

Figure 8:
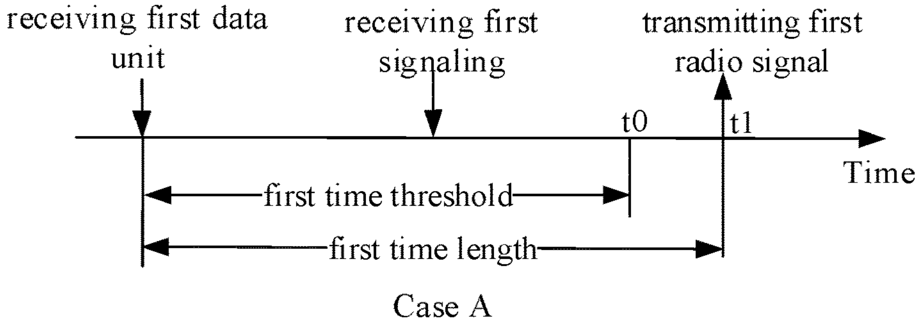
FIG. 8 illustrates a schematic diagram of relations among a first data unit, a first time threshold, a first signaling, a first time length and a first radio signal according to one embodiment of the present application.
Figure 8:
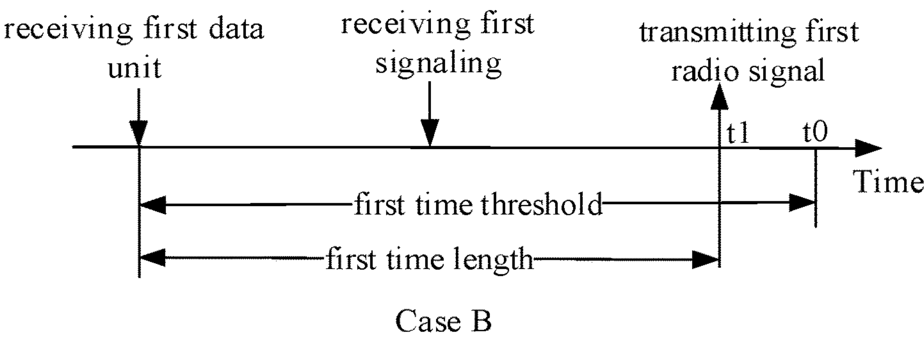

Embodiment 8 illustrates a schematic diagram of relations among a first data unit, a first time threshold, a first signaling, a first time length and a first radio signal according to one embodiment of the present application, as shown in FIG. 8. In FIG. 8, t0 is a latest time that is allowable for transmitting a first data unit; t1 is a time of transmitting a first radio signal.

In one embodiment, when the first time length is smaller than the first time threshold, the first MAC PDU comprises the at least partial bits in the first data unit; when the first time length is larger than the first time threshold, the first MAC PDU does not comprise the at least partial bits in the first data unit.

In one embodiment, when the first time length is equal to the first time threshold, the first MAC PDU comprises the first data unit.

In one embodiment, when the first time length is equal to the first time threshold, the first MAC PDU does not comprise the first data unit.

In one embodiment, when the first MAC PDU is generated after having received the first signaling, considering whether time-domain resources indicated by the first signaling can satisfy a transmission delay of the first data unit can avoid the situation in which invalid data unit is transmitted via an air interface, thus enhancing the spectrum resource utilization ratio.

In Case A in FIG. 8, t0 is earlier than t1, namely, the first time length is larger than the first time threshold, the first MAC PDU not comprising the first data unit.

In Case B in FIG. 8, t0 is later than t1, namely, the first time length is smaller than the first time threshold, the first MAC PDU comprising the first data unit.

Embodiment 9

Figure 9:
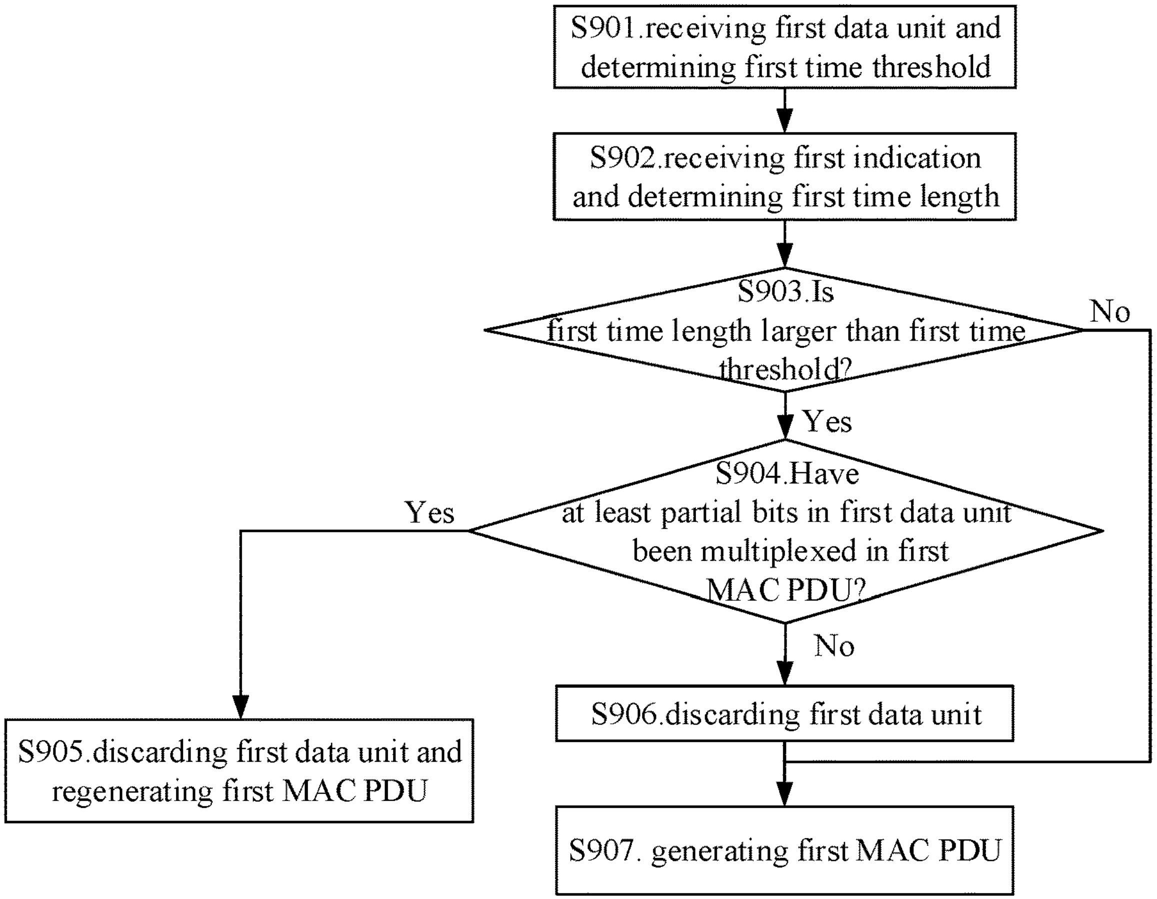
FIG. 9 illustrates a flowchart of processing in a first protocol layer according to one embodiment of the present application.

Embodiment 9 illustrates a flowchart of processing in a first protocol layer according to one embodiment of the present application, as shown in FIG. 9. Procedures in FIG. 9 are applicable to scenarios in which a first protocol layer is a MAC sublayer.

In Embodiment 9, receiving a first data unit and determining a first time threshold in step S901; receiving a first indication and determining a first time length in step S902; and determining in step S903 whether a first time length is larger than a first time threshold; if so, performing step S904, if not, performing step S907; and determining in step S904 whether at least partial bits in a first data unit have been multiplexed in a first MAC PDU; if so, performing step S905, if not, performing step S906; discarding the first data unit and regenerating a first MAC PDU in step S905; discarding the first data unit in step S906; and generating a first MAC PDU in step S907.

In one embodiment, the first transmitter, when the at least partial bits in the first data unit have been multiplexed in the first MAC PDU, reassembles the first MAC PDU in the first protocol layer; herein, the first time length is larger than the first time threshold.

In one embodiment, the phrase of reassembling the first MAC PDU comprises: regenerating the first MAC PDU after removing the at least partial bits in the first data unit multiplexed in the first MAC PDU.

In one embodiment, the phrase of reassembling the first MAC PDU comprises: removing the at least partial bits in the first data unit multiplexed in the first MAC PDU and selecting at least partial bits comprised by a second data unit from a logical channel to be multiplexed in the first MAC PDU; herein, a number of the at least partial bits (bit size) comprised by the second data unit is no larger than that of the at least partial bits (bit size) comprised by the first data unit having been removed.

In one subembodiment, the second data unit and the first data unit belong to a same logical channel.

In one subembodiment, the second data unit and the first data unit belong to different logical channels.

In one embodiment, more useful data units can be transmitted by means of the above method.

In one embodiment, when the first time length is larger than the first time threshold and the at least partial bits in the first data unit have been multiplexed in the first MAC PDU, another Logical Channel Prioritization (LCP) procedure will be triggered.

In one embodiment, the first transmitter, when any bit of the first data unit is not multiplexed in the first MAC PDU, generates the first MAC PDU in the first protocol layer; herein, the first time length is larger than the first time threshold.

In one embodiment, the first data unit is discarded after removing the at least partial bits in the first data unit having been multiplexed in the first MAC PDU.

In one embodiment, the first data unit is discarded before generating the first MAC PDU or before regenerating the first MAC PDU; herein, the first time length is larger than the first time threshold.

Embodiment 10

Figure 10:
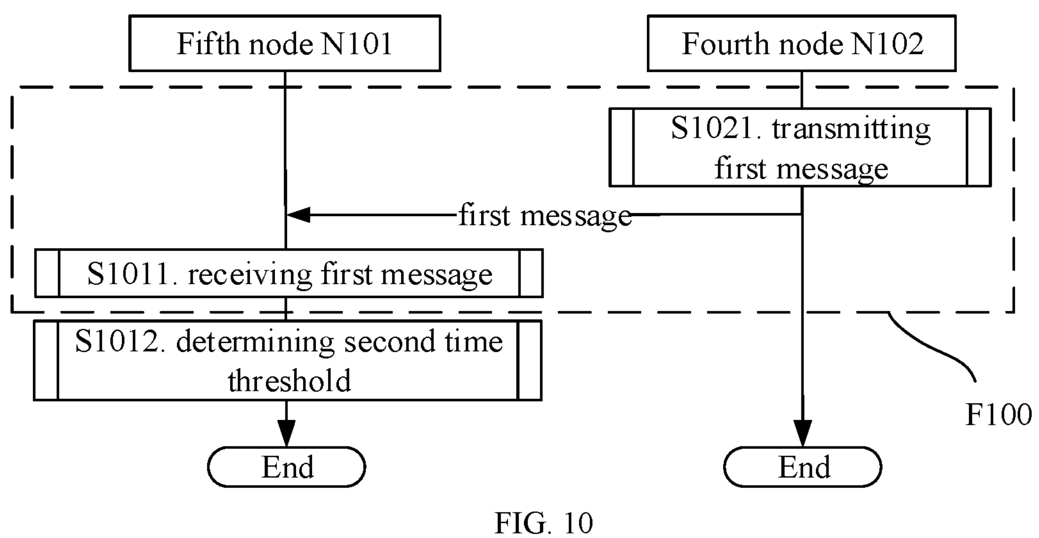
FIG. 10 illustrates a flowchart of signal transmission according to one embodiment of the present application.

Embodiment 10 illustrates a flowchart of signal transmission according to one embodiment of the present application, as shown in FIG. 10. Steps marked by the dotted-line box F100 are optional.

The fifth node N101 receives a first message in step S1011; and determines a second time threshold in step S1012.

The fourth node N102 transmits a first message in step S1021.

In one embodiment, the fifth node N101 is the first node in the present application, or the second node in the present application.

In one embodiment, when the fifth node N101 is the first node in the present application or a UE, the fifth node N101 and the fourth node N102 are in communication via N1 reference points.

In one embodiment, when the fifth node N101 is the second node in the present application, or a maintenance base station for a serving cell of a UE, the fifth node N101 and the fourth node N102 are in communication via N2 reference points.

In one embodiment, the fourth node is a core network node.

In one embodiment, the fourth node is an AMF.

In one embodiment, the fourth node is an SMF.

In one embodiment, the fourth node is non-QCL with the second node in the present application.

In one embodiment, the fourth node N102 corresponds to the MME/AMF/SMF 211 in FIG. 2 of the present application.

In one embodiment, receiving a first message, the first message being used for configuring a QoS flow to which the first data unit belongs.

In one embodiment, the first message is an upper-layer message.

In one embodiment, the first message is a Non-access stratum (NAS) message.

In one embodiment, the first message comprises a QoS configuration profile.

In one embodiment, the first message comprises a QoS rule.

In one embodiment, the first message comprises a QoS parameter of a QoS flow to which the first data unit belongs.

In one embodiment, the QoS parameter includes a PDB.

In one embodiment, the first message is received from a NAS.

In one embodiment, the first message is transmitted internally within a node.

In one subembodiment, the second node is pre-configured with a QoS configuration profile.

In one subembodiment, the first node is pre-configured with a QoS rule.

In one embodiment, the QoS configuration profile or the QoS rule comprises a QoS parameter.

In one embodiment, the first node generates a QoS rule according to received downlink traffics; herein, the first node is configured with Reflective QoS.

In one embodiment, the second time threshold is identical to a PDB value of a QoS flow to which the first data unit belongs.

In one embodiment, the second time threshold is no greater than a PDB value of a QoS flow to which the first data unit belongs.

In one embodiment, the second time threshold is a difference of a PDB value of a QoS flow to which the first data unit belongs minus a reference value.

In one embodiment, the reference value is preconfigured.

In one embodiment, the reference value is fixed.

In one embodiment, the reference value is determined by the fifth node itself.

In one embodiment, a base station receives a QoS parameter of a QoS flow to which the first data unit belongs transmitted by the core network, the QoS parameter including a PDB, and the base station determines the second time threshold based on the PDB and sends it to a UE.

In one embodiment, a UE receives a QoS parameter of a QoS flow to which the first data unit belongs transmitted by the core network, the QoS parameter including a PDB, and the UE determines the second time threshold based on the PDB.

In one embodiment, the second time threshold is used for characterizing a radio bearer to which the first data unit belongs.

In one embodiment, the second time threshold is used for characterizing a logical channel to which the first data unit belongs.

Embodiment 11

Figure 11:
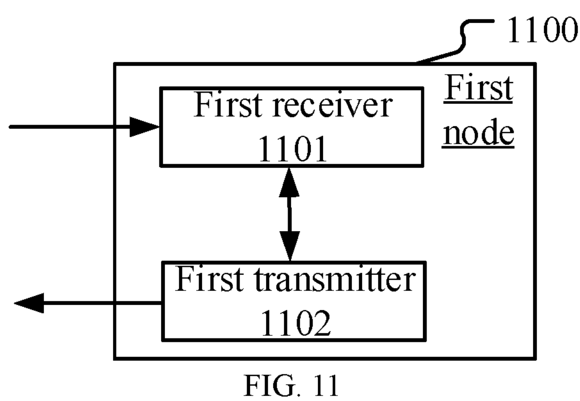
FIG. 11 illustrates a structure block diagram of a processing device in a first node according to one embodiment of the present application.

Embodiment 11 illustrates a structure block diagram of a processing device in a first node according to one embodiment of the present application, as shown in FIG. 11.

In FIG. 11, a processing device 1100 in the first node comprises a first receiver 1101 and a first transmitter 1102. The first node 1100 is a UE.

In Embodiment 11, the first receiver 1101 receives a first data unit in a first protocol layer, the first protocol layer being a layer above a physical layer; the first receiver 1101 receives a first signaling, the first signaling indicating an initial transmission; and the first transmitter 1102 transmits a first radio signal, the first radio signal carrying a first MAC PDU, the first signaling scheduling the first radio signal; herein, a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

In one embodiment, when the first time length is smaller than the first time threshold, the first MAC PDU comprises the at least partial bits in the first data unit; when the first time length is larger than the first time threshold, the first MAC PDU does not comprise the at least partial bits in the first data unit.

In one embodiment, the first transmitter 1102 transmits a first indication to the first protocol layer, the first indication indicating time-domain resources occupied by the first radio signal; herein, the first indication is used to determine the first time length.

In one embodiment, the first transmitter 1102 discards the first data unit in the first protocol layer when the first time length is larger than the first time threshold.

In one embodiment, the first transmitter 1102, when the at least partial bits in the first data unit have been multiplexed in the first MAC PDU, reassembles the first MAC PDU in the first protocol layer; herein, the first protocol layer is a MAC sublayer; the first time length is larger than the first time threshold.

In one embodiment, when the first signaling schedules a second radio signal, time-domain resources occupied by the first radio signal are no later than time-domain resources occupied by the second radio signal.

In one embodiment, the first receiver 1101 receives a second signaling, the second signaling indicating a second time threshold; herein, the second time threshold indicates a longest residing time of a first PDCP SDU in a PDCP sublayer, the first PDCP SDU being used to generate the first data unit; the second time threshold and a protocol processing time are used to determine the first time threshold, where the first protocol layer is an RLC sublayer or a MAC sublayer.

In one embodiment, the first transmitter is used for inter-layer communication.

In one embodiment, the first transmitter comprises inter-layer transmitted primitives.

In one embodiment, the first transmitter comprises a set of instructions for completing the transmitting function.

In one embodiment, the first receiver 1101 comprises the receiver 454 (comprising the antenna 452), the receiving processor 456, the multi-antenna receiving processor 458 and the controller/processor 459 in FIG. 4 of the present application.

In one embodiment, the first receiver 1101 comprises at least one of the receiver 454 (comprising the antenna 452), the receiving processor 456, the multi-antenna receiving processor 458 or the controller/processor 459 in FIG. 4 of the present application.

In one embodiment, the first receiver 1101 comprises the controller/processor 459 in FIG. 4 of the present application.

In one embodiment, the first transmitter 1102 comprises the receiver 454 (comprising the antenna 452), the transmitting processor 468, the multi-antenna transmitting processor 457 and the controller/processor 459 in FIG. 4 of the present application.

In one embodiment, the first transmitter 1102 comprises at least one of the receiver 454 (comprising the antenna 452), the transmitting processor 468, the multi-antenna transmitting processor 457 or the controller/processor 459 in FIG. 4 of the present application.

In one embodiment, the first transmitter 1102 comprises the controller/processor 459 in FIG. 4 of the present application.

Embodiment 12

Figure 12:
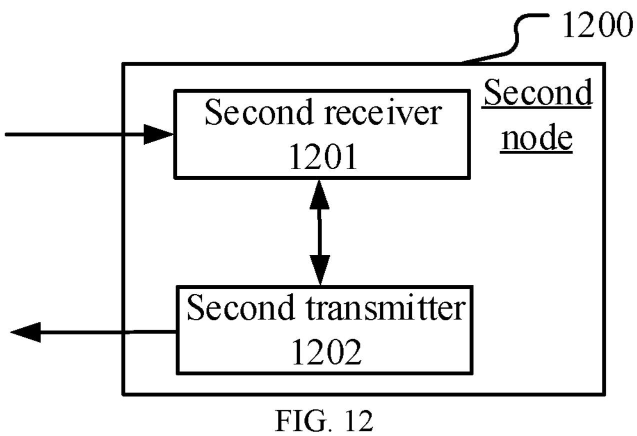
FIG. 12 illustrates a structure block diagram of a processing device in a second node according to one embodiment of the present application.

Embodiment 12 illustrates a structure block diagram of a processing device in a second node according to one embodiment of the present application, as shown in FIG. 12. In FIG. 12, a processing device 1200 in the second node comprises a second receiver 1201 and a second transmitter 1202; the second node 1200 is a base station.

In Embodiment 12, a second transmitter 1202 transmits a first signaling, the first signaling indicating an initial transmission; and the second receiver 1201 receives a first radio signal, the first radio signal carrying a first MAC PDU, the first signaling scheduling the first radio signal; herein, a first data unit is received in a first protocol layer, the first protocol layer being a layer above a physical layer; a first time length is equal to a time interval length between a reception of the first data unit and a transmission of the first radio signal, and whether the first MAC PDU comprises at least partial bits in the first data unit is related to a relative magnitude of the first time length and a first time threshold; the first time threshold indicates a longest time interval from the first data unit being received in the first protocol layer to the first data unit being transmitted.

In one embodiment, when the first time length is smaller than the first time threshold, the first MAC PDU comprises the at least partial bits in the first data unit; when the first time length is larger than the first time threshold, the first MAC PDU does not comprise the at least partial bits in the first data unit.

In one embodiment, a first indication is transmitted to the first protocol layer, the first indication indicating time-domain resources occupied by the first radio signal; herein, the first indication is used to determine the first time length.

In one embodiment, the first data unit is discarded in the first protocol layer when the first time length is larger than the first time threshold.

In one embodiment, when the at least partial bits in the first data unit have been multiplexed in the first MAC PDU, the first MAC PDU is reassembled in the first protocol layer; herein, the first protocol layer is a MAC sublayer; the first time length is larger than the first time threshold.

In one embodiment, when the first signaling schedules a second radio signal, time-domain resources occupied by the first radio signal are no later than time-domain resources occupied by the second radio signal.

In one embodiment, the second transmitter 1202 transmits a second signaling, the second signaling indicating a second time threshold; herein, the second time threshold indicates a longest residing time of a first PDCP SDU in a PDCP sublayer, the first PDCP SDU being used to generate the first data unit; the second time threshold and a protocol processing time are used to determine the first time threshold, where the first protocol layer is an RLC sublayer or a MAC sublayer.

In one embodiment, the second receiver 1201 comprises the transmitter 418 (comprising the antenna 420), the receiving processor 470, the multi-antenna receiving processor 472 and the controller/processor 475 in FIG. 4 of the present application.

In one embodiment, the second receiver 1201 comprises at least one of the transmitter 418 (comprising the antenna 420), the receiving processor 470, the multi-antenna receiving processor 472 or the controller/processor 475 in FIG. 4 of the present application.

In one embodiment, the second transmitter 1202 comprises the transmitter 418 (comprising the antenna 420), the transmitting processor 416, the multi-antenna transmitting processor 471 and the controller/processor 475 in FIG. 4 of the present application.

In one embodiment, the second transmitter 1202 comprises at least one of the transmitter 418 (comprising the antenna 420), the transmitting processor 416, the multi-antenna transmitting processor 471 or the controller/processor 475 in FIG. 4 of the present application.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first-type communication node or UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second-type communication node or base station or network-side device in the present application includes but is not limited to macro-cellular base stations, micro-cellular base stations, home base stations, relay base station, eNB, gNB, Transmitter Receiver Point (TRP), relay satellite, satellite base station, airborne base station, test equipment like transceiving device simulating partial functions of base station or signaling tester and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A User Equipment (UE) for wireless communications, the UE comprising:

a processor and a receiver configured to receive a first data unit in a first protocol layer, the first protocol layer being a layer above a physical layer;

the processor and the receiver configured to receive a first signaling, the first signaling indicating an initial transmission; and the processor and a transmitter configured to transmit a first radio signal, the first radio signal carrying a first Medium Access Control (MAC) Protocol Data Unit (PDU), the first signaling scheduling the first radio signal, wherein a first time length is equal to a time interval length between a reception of the first data unit and a transmission of the first radio signal, and whether the first MAC PDU comprises at least a portion of bits in the first data unit is related to a relative magnitude of the first time length and a first time threshold, and wherein the first time threshold indicates a longest time interval from the first data unit being received in the first protocol layer to the first data unit being transmitted.

2. The UE according to claim 1, wherein: when the first time length is smaller than the first time threshold, the first MAC PDU comprises the at least the portion of bits in the first data unit; and when the first time length is larger than the first time threshold, the first MAC PDU does not comprise the at least the portion of bits in the first data unit.

3. The UE according to claim 1, wherein:

the processor and the first transmitter are further configured to transmit a first indication to the first protocol layer, the first indication indicating time-domain resources occupied by the first radio signal;

wherein the first indication is used to determine the first time length.

4. The UE according to claim 1, wherein:

the processor and the transmitter are further configured to discard the first data unit in the first protocol layer when the first time length is larger than the first time threshold.

5. The UE according to claim 1, wherein:

the processor and the transmitter are further configured to, when the at least the portion of bits in the first data unit have been multiplexed in the first MAC PDU, reassemble the first MAC PDU in the first protocol layer, wherein the first protocol layer is a MAC sublayer, and wherein the first time length is larger than the first time threshold.

6. The UE according to claim 1, wherein when the first signaling schedules a second radio signal, time-domain resources occupied by the first radio signal are no later than time-domain resources occupied by the second radio signal.

7. The UE according to claim 1, wherein:

the processor and the receiver are further configured to receive a second signaling, the second signaling indicating a second time threshold;

wherein the second time threshold indicates a longest residing time of a first Packet Data Convergence Protocol (PDCP) Service Data Unit (SDU) in a PDCP sublayer, the first PDCP SDU being used to generate the first data unit; the second time threshold and a protocol processing time are used to determine the first time threshold, where the first protocol layer is a Radio Link Control (RLC) sublayer or a MAC sublayer.

8. A base station, comprising:

a processor and a transmitter configured to transmit a first signaling, the first signaling indicating an initial transmission; and the processor and a second receiver configured to receive a first radio signal, the first radio signal carrying a first Medium Access Control (MAC) Protocol Data Unit (PDU), the first signaling scheduling the first radio signal, wherein a first data unit is received in a first protocol layer, the first protocol layer being a layer above a physical layer, wherein a first time length is equal to a time interval length between a reception of the first data unit and a transmission of the first radio signal, and whether the first MAC PDU comprises at least a portion of bits in the first data unit is related to a relative magnitude of the first time length and a first time threshold, and wherein the first time threshold indicates a longest time interval from the first data unit being received in the first protocol layer to the first data unit being transmitted.

9. The base station according to claim 8, wherein: when the first time length is smaller than the first time threshold, the first MAC PDU comprises the at least the portion of bits in the first data unit; when the first time length is larger than the first time threshold, the first MAC PDU does not comprise the at least the portion of bits in the first data unit.

10. The base station according to claim 8, that the processor and the transmitter configured to transmit a first indication to the first protocol layer, the first indication indicating time-domain resources occupied by the first radio signal, wherein the first indication is used to determine the first time length.

11. The base station according to claim 8, wherein when the first time length is larger than the first time threshold, the first data unit is discarded in the first protocol layer.

12. The base station according to claim 8, wherein: when the at least the portion of bits in the first data unit have been multiplexed in the first MAC PDU, the first MAC PDU is reassembled in the first protocol layer, wherein the first protocol layer is a MAC sublayer, and wherein the first time length is larger than the first time threshold.

13. The base station according to claim 8, the processor and the transmitter further configured to transmit a second signaling, the second signaling indicating a second time threshold, wherein the second time threshold indicates a longest residing time of a first Packet Data Convergence Protocol (PDCP) Service Data Unit (SDU) in a PDCP sublayer, the first PDCP SDU being used to generate the first data unit; the second time threshold and a protocol processing time are used to determine the first time threshold, wherein the first protocol layer is a Radio Link Control (RLC) sublayer or a MAC sublayer.

14. A method performed by a User Equipment (UE), the method comprising:

receiving a first data unit in a first protocol layer, the first protocol layer being a layer above a physical layer;

receiving a first signaling, the first signaling indicating an initial transmission; and transmitting a first radio signal, the first radio signal carrying a first Medium Access Control (MAC) Protocol Data Unit (PDU), the first signaling scheduling the first radio signal, wherein a first time length is equal to a time interval length between a reception of the first data unit and a transmission of the first radio signal, and whether the first MAC PDU comprises at least a portion of bits in the first data unit is related to a relative magnitude of the first time length and a first time threshold, and wherein the first time threshold indicates a longest time interval from the first data unit being received in the first protocol layer to the first data unit being transmitted.

15. The method according to claim 14, wherein: when the first time length is smaller than the first time threshold, the first MAC PDU comprises the at least the portion of bits in the first data unit; when the first time length is larger than the first time threshold, the first MAC PDU does not comprise the at least the portion of bits in the first data unit.

16. The method according to claim 14, further comprising:

transmitting a first indication to the first protocol layer, the first indication indicating time-domain resources occupied by the first radio signal;

wherein the first indication is used to determine the first time length.

17. The method according to claim 14, further comprising:

discarding the first data unit in the first protocol layer when the first time length is larger than the first time threshold.

18. The method according to claim 14, further comprising:

when the at least the portion of bits in the first data unit have been multiplexed in the first MAC PDU, reassembling the first MAC PDU in the first protocol layer, wherein the first protocol layer is a MAC sublayer, and wherein the first time length is larger than the first time threshold.

19. The method according to claim 14, wherein: when the first signaling schedules a second radio signal, time-domain resources occupied by the first radio signal are no later than time-domain resources occupied by the second radio signal.

20. The method according to claim 14, further comprising:

receiving a second signaling, the second signaling indicating a second time threshold;

wherein the second time threshold indicates a longest residing time of a first Packet Data Convergence Protocol (PDCP) Service Data Unit (SDU) in a PDCP sublayer, the first PDCP SDU being used to generate the first data unit, wherein the second time threshold and a protocol processing time are used to determine the first time threshold, and wherein the first protocol layer is a Radio Link Control (RLC) sublayer or a MAC sublayer.

* * * * *